(No Model.)
R. J. SNYDER.
METHOD OF AND APPARATUS FOR ALIGNING MACHINERY.
No. 529,315.　　　　　　　　Patented Nov. 13, 1894.
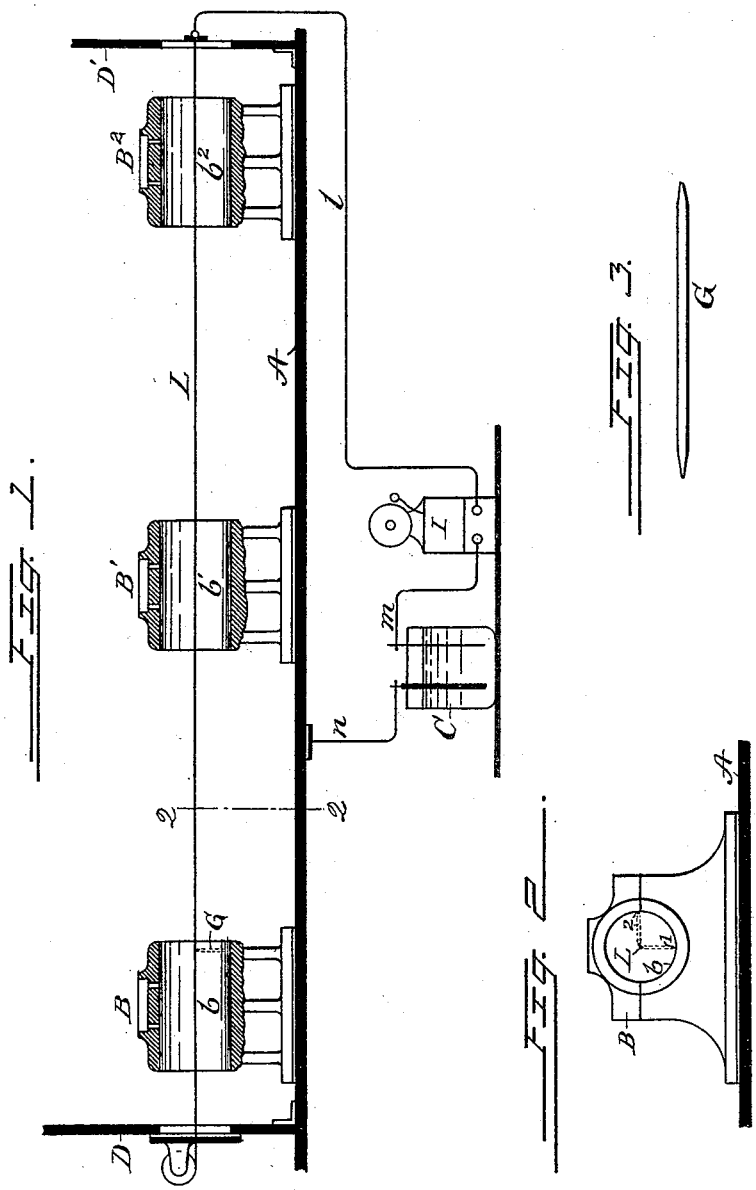

UNITED STATES PATENT OFFICE.

ROBERT J. SNYDER, OF BETHLEHEM, PENNSYLVANIA, ASSIGNOR TO GRACE MARION SNYDER, OF SAME PLACE.

METHOD OF AND APPARATUS FOR ALIGNING MACHINERY.

SPECIFICATION forming part of Letters Patent No. 529,315, dated November 13, 1894.

Application filed January 30, 1894. Serial No. 498,438. (No model.)

*To all whom it may concern:*

Be it known that I, ROBERT J. SNYDER, a citizen of the United States, residing at Bethlehem, county of Northampton, State of Pennsylvania, have invented certain new and useful Improvements in Methods of and Apparatus for Aligning Machinery, of which the following is a specification.

In the erection of machinery such for instance as steam engines it is the common practice to adjust the parts to their proper positions by means of an adjustment line which is drawn taut between end supports, the several parts being properly set with relation to said line. To accomplish this one or more gages are employed measuring the proper distances from convenient finished surfaces to the adjustment line, so that when one end of a gage is held in contact with such surface and the other just touches the adjustment line such surface will be properly located in the direction measured. In practice it requires considerable skill as well as delicacy of touch and eyesight to accurately locate the parts, the line being unavoidably deflected to some slight extent even by such contact with the gage as will be detected only by an expert thus rendering the operation tedious and difficult and liable to sufficient inaccuracy to materially affect the practical working of the finished machine.

The objects of my invention are to facilitate the operation of properly adjusting the parts with relation to the adjustment line and to eliminate the error apt to arise from want of sufficient delicacy of sight and touch in the operator; and I accomplish both of these objects by positively and automatically indicating the slightest contact with the adjustment line. A simple apparatus by means of which I accomplish this is illustrated in the accompanying drawings in which are represented, as a common arrangement of mechanism to which my invention is applicable, three bearings B B' B² which are to be mounted upon a bed plate A so as to bring their finished bearing surfaces, $b$ $b'$ $b^2$ exactly in line.

Figure 1 is a longitudinal section through the three bearings and the bed plate. Fig. 2 is a transverse section through 2—2 of Fig. 1. Fig. 3 shows a simple form of gage.

To any convenient fixed points as D D' are fastened the opposite ends of a metallic line L, preferably copper wire stretched to a considerable tension. The end supports D D' are insulated from the machine with which an open circuit is formed from the battery C through the line L by means of connections $l$ $m$ $n$, any suitable indicator such as a bell I being included in the circuit as desired.

The bearings being placed in approximately proper position upon the bed plate, the operation of adjusting them to line is readily and accurately effected by means of a suitable gage G which measures exactly the proper distance from the finished surface $b$ of the bearing to the line. One end of this gage being rested upon the surface $b$ for instance at a point 1 below the line L, the relative position of the bearing and line is adjusted until the circuit is closed by the upper end of the gage barely making contact with the line L as it is moved transversely under the line. The gage is then set to another point 2 and adjustment made transversely until the circuit is closed in like manner; the operation being repeated until each bearing gages exactly at both ends when all will be accurately in line.

By my improved method it is evident that no dependence need be placed upon the delicacy of sight or touch of the operator, the slightest contact of the gage with the adjustment line being positively and automatically indicated by the passage of the electric current. The sounding of the bell I will serve to inform the assistants when the adjustment in any given direction is sufficient.

The apparatus may be readily modified to suit different machinery.

What I claim is—

1. The method of aligning machinery which consists in forming an open electric circuit through said machinery and the adjustment line, and completing the circuit in adjusting said machinery to the line, substantially as set forth.

2. An electrical aligning mechanism consisting of an adjustment line arranged in circuit with the machinery to be adjusted thereto and a gage adapted to open and close the circuit, substantially as set forth.

3. An electrical aligning mechanism consisting of an adjustment line arranged in circuit with the machinery to be adjusted thereto and with an indicator and a gage adapted to open and close the circuit, substantially as set forth.

In testimony whereof I affix my signature in presence of two witnesses.

ROBERT J. SNYDER.

Witnesses:
E. C. RHOADS,
W. G. STEWART.